(12) United States Patent
Hannig (10) Patent No.: US 9,376,822 B2
(45) Date of Patent: Jun. 28, 2016

(54) LOCKING SYSTEM FOR PANELS, AND PANEL WITH LOCKING SYSTEM

(71) Applicant: AKZENTA PANEELE + PROFILE GMBH, Kaisersesch (DE)

(72) Inventor: Hans-Juergen Hannig, Bergisch Gladbach (DE)

(73) Assignee: AKZENTA PANEELE + PROFILE GMBH, Kaisersesch (DE)

( * ) Notice: Subject to any disclaimer, the term of this patent is extended or adjusted under 35 U.S.C. 154(b) by 0 days.

(21) Appl. No.: 14/363,518

(22) PCT Filed: Dec. 5, 2012

(86) PCT No.: PCT/EP2012/074508
§ 371 (c)(1),
(2) Date: Jul. 7, 2014

(87) PCT Pub. No.: WO2013/083629
PCT Pub. Date: Jun. 13, 2013

(65) Prior Publication Data
US 2015/0176289 A1 Jun. 25, 2015

(30) Foreign Application Priority Data
Dec. 6, 2011 (DE) .................... 20 2011 108 752 U (51) Int. Cl.
*E04F 15/02* (2006.01)
*E04F 13/08* (2006.01)
(Continued)

(52) U.S. Cl.
CPC ....... *E04F 15/02038* (2013.01); *E04F 13/0894* (2013.01); *E04F 19/00* (2013.01);
(Continued)

(58) Field of Classification Search
CPC . E04F 15/02038; E04F 19/00; E04F 13/0894; E04F 2201/0176; E04F 2201/0552; E04F 2201/588; F16B 5/0064; F16B 5/008; F16B 5/0016
See application file for complete search history.

(56) References Cited

U.S. PATENT DOCUMENTS

| | | | |
|---|---|---|---|
| 2009/0217615 A1* | 9/2009 | Engstrom | 52/588.1 |
| 2010/0083603 A1 | 4/2010 | Goodwin | |
| 2011/0173914 A1* | 7/2011 | Engstrom | 52/582.2 |

FOREIGN PATENT DOCUMENTS

| | | |
|---|---|---|
| DE | 203 04 761 U1 | 4/2004 |
| DE | 10 2005 002 297 A1 | 8/2005 |
| DE | 10 2009 038 750 A1 | 3/2011 |
| EP | 2415944 A1 | 2/2012 |

(Continued)

*Primary Examiner* — Patrick Maestri
(74) *Attorney, Agent, or Firm* — Lucas & Mercanti, LLP (57) ABSTRACT

The invention relates to a locking system (1) for plate-shaped panels (4.1, 4.2) with hook-profiled sections (5.1, 5.2) which complement one another and each of which is provided with a hook element (6). The hook elements (6) of complementary hook-profiled sections (5.1, 5.2) of adjacent panels (4.1, 4.2) hook in a joining movement (f) so as to engage into one another into a connected position. A profiled locking element (11) which has a first spring portion (12.1) and a first foot portion (13.1) is provided, said locking element being insertable into a first undercut (9.1) of a first hook-profiled section (5.1). The first undercut (9.1) of at least the first hook-profiled section (5.1) has a second undercut (9.2) which is effective perpendicular to the larger lateral surfaces (2) and into which the first spring portion (12.1) of the locking element (11) automatically locks from an open position into a locking position upon reaching the connected position of the two panels (4.1, 4.2). The second undercut (9.2) has a space (14) in which or into which the first spring portion (12.1) of the locking element (11) can be elastically deflected into the open position.

12 Claims, 5 Drawing Sheets

(51) Int. Cl.
*F16B 5/00* (2006.01)
*E04F 19/00* (2006.01)

(52) U.S. Cl.
CPC .............. *F16B 5/008* (2013.01); *F16B 5/0016* (2013.01); *F16B 5/0064* (2013.01); *E04F 2201/0176* (2013.01); *E04F 2201/0552* (2013.01); *E04F 2201/0588* (2013.01)

(56) References Cited

FOREIGN PATENT DOCUMENTS

| WO | 0047841 | A1 | 8/2000 |
| WO | WO03016654 | A1 | 2/2003 |
| WO | 2007008139 | A1 | 1/2007 |

\* cited by examiner

LOCKING SYSTEM FOR PANELS, AND PANEL WITH LOCKING SYSTEM

CROSS-REFERENCE TO RELATED APPLICATIONS

This application is a 371 of PCT/EP2012/074508 filed Dec. 6, 2012, which in turn claims the priority of DE 20 2011 108 752.6 filed Dec. 6, 2011, the priority of both applications is hereby claimed and both applications are incorporated by reference herein.

The invention concerns a locking system for plate-shaped panels which each have two larger side surfaces and edges and which for the connection of similar panels to provide a floor, wall or ceiling covering are provided at least at two mutually opposite edges with mutually complementary profiles, a first hook profile and a second hook profile, each with a hook element which has a hook projection and first undercut operative in a transverse direction perpendicular to the larger side surfaces and to a longitudinal direction of the oppositely disposed edges, wherein the hook elements of complementary hook profiles of adjacent panels hook in engaging relationship into a connecting position in a joining movement with at least one component perpendicularly to the larger side surface with respective engagement of its hook projection into the first undercut of the respective other hook element, there is provided a profile-like lock element which has a first spring portion and a first foot portion and which can be inserted in the first undercut of the first hook profile, the first undercut at least of the first hook profile has a second undercut operative perpendicularly to the larger side surfaces and the lock element with attainment of the connecting position of the two panels automatically engages with its first spring portion in a locking movement from an open position into a third undercut of the hook element of the second hook profile, said third undercut being operative perpendicularly to the larger side surfaces and being in opposite relationship in the connecting position of the two panels to the second undercut of the first hook profile, with positive locking of the two hook profiles perpendicularly to the larger side surfaces into a locking position. The invention further concerns a panel having the locking system.

A locking system of the general kind set forth is known from WO 00/47841, in which there is provided a lock element having two end spring portions and which is inserted into the first and second undercuts to line them.

WO 2007/008139 A1 describes a locking system in which the lock element is inserted with a locking portion into the second undercut, bearing against a wall thereof, wherein its foot portion is lifted off by a wall of the first undercut of the first hook profile. With a downward movement of the second hook profile it presses the foot portion against the wall of the first undercut, whereby at the same time the locking portion is levered into the third undercut.

WO 03/016654 discloses a locking system in which the locking element is inserted with its foot portion in an additional groove in the transverse direction and secured there.

The object of the invention is to provide a locking system of the kind set forth in opening part of this specification, which is of a simple structure and which reliably locks panels in the connecting position.

According to the invention that object is attained by the features of claim 1. Advantageous developments are recited in the appendant claims. The specified object is already attained in that the lock element is supported with the first foot portion in the first undercut and the second undercut has a space which is delimited by the lock element in the locking position and the first hook profile and in which or into which the lock element can be elastically deflected with its first spring portion into the open position.

Thus there is provided a locking system having a lock element of a simple structure. It has the advantage that the lock element can be equally inserted into a position from which it can be deflected with its first spring portion. By means of the space provided, the arrangement ensures that deflection of the spring portion against a spring force cannot be impeded so that the lock element can engage into the third undercut with its first spring portion with at least partial spring stress relief. Preferably the lock element with its first spring portion is so arranged and/or dimensioned in spaced relationship with the wall of the first hook profile, that delimits the second undercut, that a first free space for receiving foreign particles like dust and abrasion remains in the space even in its open position of the lock element, which foreign particles would otherwise prevent precise complete joining movement until the panels were in their final position.

The hook profiles can have usual hook elements with lateral inclined portions predominantly facing in the transverse direction, a first inclined portion laterally delimiting the first undercut and a second inclined portion in opposite relationship to the first inclined portion in the transverse direction, against which they can slide in the joining movement. By way thereof the edges of the two panels can pull against each other and can be pressed against each other in abutting surfaces perpendicularly to the transverse direction in a connecting plane, in such a way that no gap formation occurs at the top side of the mutually adjoining panels. That is described in greater detail in WO 03/016654 to which reference is directed in that respect.

The lock element can be in the form of a preferably continuous elongate profile member. Preferably the elongate profile member is laterally open. The elongate profile member can advantageously be of a simple configuration without channels. It can thus be of a configuration without laterally outwardly closed channels.

The lock element which is inserted into the first undercut of the first hook profile can slide against the second inclined portion of the second hook profile with the joining movement with its first spring portion, with elastic deflection thereof into the second undercut of the first hook profile, and, with the attainment of the third undercut of the second hook element, can engage in locking relationship into the third undercut with the two panels being connected in positively locking relationship. Preferably the associated second undercut of the first hook profile and third undercut of the second hook profile are disposed in mutually opposite relationship in the connecting position in the connecting plane. Thus the lock element can engage into the third undercut, passing through the connecting plane. The lock element can bear against the hook element of the second hook profile, under a slight spring prestressing. The second inclined portion of a hook element, at least insofar as the lock element is to slide against that second inclined portion, can be placed more steeply than its first inclined portion, that is to say it can have a lesser directional component in the transverse direction than its first inclined portion. In that way the first spring portion can advantageously be more greatly deflected and prestressed. It will be appreciated that the relationships generally and also when the arrangement includes an additional second spring portion as described hereinafter can apply with cyclic interchange of the ordinals first and second used as adjectives.

That configuration of the locking system can be provided for all mutually complementary pairs of edges of the panel. In the case of right-angled panels there can be two pairs of edges each having two mutually complementary hook profiles. The joining movement can be effected in the usual way with the fitment of a new upper panel to a lower panel which has already been laid and which is disposed in a laying plane, with at least a component perpendicularly to the larger side surface. In that case the upper panel can be moved downwardly on to the lower panel perpendicularly to the larger side surfaces thereof, in which case the lock element is preferably uniformly deflected into its open position over its entire length and is locked into its locking position. The joining movement can also be effected by the upper panel being pivoted on the lower panel. For that purpose the new panel can be fitted to the lower panel and then pivoted downwardly or folded downwardly until it is in the common laying plane of the panels and locks automatically. At the corner facing away from the rest of the floor covering or preferably at the facing hook profile of the lower panel, the upper panel can be attached inclinedly, that is to say at an angle of greater than 0° and less than 90°, relative to its larger side surface or relative to the common laying plane, and can be pivoted into the laying plane at the corner or hook profile, as the pivot point. In that case the lock element can be progressively deflected over its length corresponding to the advance in the pivotal movement, and can initially at least partially lock. The pivotal movement of the upper panel on the lower panel is described for example in DE 10 2005 062 361 A1, the disclosure of which is hereby incorporated into the disclosure of this application in respect of the pivoting process described therein.

Preferably the locking profile according to the invention is provided only at two mutually complementary hook profiles. If the panels are provided elongately with longer and shorter edges then the locking system according to the invention is preferably to be arranged at the shorter edges. The longer edges can for example have another known locking system or a usual tongue-and-groove profile.

Preferably a second free space remains between the first spring portion and the second inclined portion of the hook element of the second hook profile in the locking position of the lock element for foreign particles. That second free space can be enlarged in a wedge-shaped configuration in the direction towards the first foot portion.

Preferably the first foot portion of the lock element is supported in areal relationship in the first undercut. The hook profiles can each have a groove-like recess which contains the first undercut and the second undercut and which has a groove bottom and groove side walls. The first groove side wall can provide the first inclined portion. The groove side wall which is the first groove side wall can delimit the first undercut and the other groove side wall which is the second groove side wall can delimit the second undercut. The lock element can be supported with its first foot portion at the groove bottom and the groove side walls of the associated first recess. In the inserted position the lock element can be arranged by way of its first foot portion in positively locking relationship in the recess, bearing against at least one of the groove side walls and the groove bottom. For fixing it in position in the inserted condition, the lock element can be arranged clamped in place under a preferably slight degree of prestressing between the groove side walls.

The first foot portion can be adapted to the groove bottom. It can bear with a contact surface in areal relationship preferably over the entire groove bottom, wherein the contact surface and the groove bottom can involve a congruent profile. The first foot portion of the lock element can be straight, that is to say non-curved or non-bent. The groove bottom can be arranged at least approximately parallel to the larger side surfaces. In that way the lock element can be latched into the third undercut, without deformation of the first foot portion.

In matching relationship with the second hook profile, the first foot portion can be angled at a first angle of greater than 90° relative to the first spring portion. The groove bottom can extend at least approximately parallel to the larger side surfaces. In matching relationship with the second inclined portion of the hook element of the second hook profile the first foot portion can be angled at a first angle of greater than 90° relative to the first spring portion. The first angle is preferably less than the inclination of the second inclined portion of the second hook profile. The second groove side wall and the groove bottom can include a second angle which is preferably somewhat greater, preferably up to 20° greater, than the first angle between the first foot portion and the first spring portion of the lock element. That can provide the space for the pivotal movement of the first spring portion.

Preferably the hook projection of the second hook profile is supported against the first recess in the connecting position by way of the lock element. In that way transmission of force can be effected at that location perpendicularly to the larger side surfaces, between the hook profiles.

In a preferred embodiment the lock element can have a second spring portion spaced in the transverse direction relative to the first spring portion. The free end of the first spring portion can face in a direction which is at least approximately in opposite relationship to the direction in which the free end of the second spring portion faces. The second spring portion can be deflected elastically into the open position to provide a further locking action between the complementary hook profiles, preferably simultaneously with the deflection of the first spring portion, with sliding movement against the second inclined portion of the first hook profile, into a second undercut provided on the second hook profile. When the connected position of the two panels is reached the second spring portion can resiliently engage automatically from the open position into the locking position, into a third undercut provided on the one hook element of the first hook profile in positively locking relationship, in an advantageous fashion in terms of force mechanics, preferably in a second locking movement which is at least approximately opposite to the first locking movement. The free end of the second spring portion can face at least approximately in the joining movement in the locking position.

The spacing of the spring portions can be implemented by way of a transverse leg, for example by way of the first foot leg. The transverse leg can be arranged to extend at least approximately inclinedly relative to the larger side surfaces so that the two spring portions in the locking position are arranged at least approximately at the same height, with respect to a panel thickness.

The lock element can have a further portion immediately adjoining the first foot portion at the end. That further portion can be angled relative to the first foot portion at a third angle of greater than 90° and can be arranged spaced relative to the first spring portion in the transverse direction. The portion can include an acute angle with the first spring portion. Both can be arranged to extend away from each other in a wedge-like configuration. Preferably the first spring portion and the further portion are arranged at least approximately at the same height with respect to the panel thickness. The lock element, with the three portions, the first spring portion, the first foot leg and the portion, involving a U-shaped cross-section, can be formed with the first foot portion as the transverse leg and with the first spring portion and the portion respectively in the form of limbs extending at the end from the transverse leg. In the locking position the lock element can embrace the hook projection of the second hook profile from three sides. In the locking position, the lock element can bear with the first foot portion and the portion in positively locking relationship against the hook projection of the second hook profile and of the first hook projection. In that way force transmission can be effected at those location by way of the lock element in the transverse direction or in the direction of the joining movement.

Preferably the first foot portion and the portion are arranged in the insertion position in positively locking relationship in the first undercut. The lock element can bear in the insertion position with the portion against the first groove side wall which delimits the first undercut. Preferably the third angle, in the non-loaded condition of the lock element, is somewhat greater than the angle included by the groove bottom and the second groove side wall or the first inclined portion. In that way, upon insertion into the first recess, the lock element can be scarcely noticeably elastically bent at that location and thus elastically prestressed. All those measures can overall provide for improved fixing in position of the lock element in the first undercut of the first hook profile.

If the portion has a free end, then the cross-section at that free end can preferably narrow in the manner of a truncated wedge configuration, with the formation of an inclined plane, to permit the hook elements to more easily engage into each other, by the hook element of the second hook profile engaging that inclined plane with its first inclined portion.

The lock element of the locking system can have a second foot portion which adjoins the portion and which is arranged in an advantageous fashion in terms of force mechanics spaced at least approximately parallel relative to the first foot portion or in the locking position relative to the larger side surfaces. That makes it possible to achieve a further improvement in terms of fixing the position of the lock element in the first recess in a first insertion position. In addition the hook profiles in the connecting position can bear against each other to transmit force in an advantageous fashion in terms of force mechanics, either by way of the first or by way of the second foot portion. In that way, a third free space can be respectively provided at the respectively non-loaded foot portion, more specifically between the hook element and that foot portion and/or between that foot portion and the wall of the first undercut, for example for receiving foreign particles and/or for compensating for fitment inaccuracies.

Preferably the spring portions and the portion are arranged at least approximately at the same height with respect to the panel thickness. The lock element in the insertion position can embrace the hook projection of the first hook profile from three sides and can thus be even better fixed in position to the first hook profile. The lock element with the two spring portions, the two foot portions and the central portion, can be of an angular S-shaped profile with preferably rounded edges. That S-profile shape can have centrally the portion and, extending therefrom at respective ends thereof, a respective foot portion with a spring portion connected there at the end. In that way the lock element can be at least approximately of an axis-symmetrical configuration in relation to a central longitudinal axis arranged centrally in the portion, as the axis of mirror symmetry.

To simplify manufacture, in regard to the geometrical relationships, in particular the angle relationships with each other and with respect to the first undercut of the second hook element, the second spring portion and/or the second foot portion can be of the same configuration as the first spring portion and the first foot portion respectively, and in addition can be arranged relative to each other and relative to the portion in the same way.

In a similar way as with the first spring portion, in the case of the second spring portion a free space referred here to as the fourth free space can be respectively provided at both sides in the transverse direction for receiving the foreign particles and for compensating for dimensional inaccuracies. Those fourth free spaces can be connected to the third free spaces.

The first spring portion and/or the second spring portion can each have a hook-like free end with a laterally protruding projection with which the lock element in the locking position bears in positively locking relationship for positively lockingly connecting the panels in the respectively associated second and third undercuts. In that respect the hook-like end can bear at the underside of its laterally protruding projection against a wall region of the third undercut, that is preferably parallel to the larger side surfaces, and is operative for the transmission of force. It can also bear in positively locking relationship perpendicularly to the larger side surfaces with an end region against a wall region of the second undercut, that is preferably parallel to the larger side surfaces.

At its projection which preferably converges in a wedge-like configuration the hook-like free end can have a ramp which is advantageous in terms of force mechanics and against which the respectively associated hook element slides in the joining movement with deflection of the spring portion, into the open position. A fifth free space for foreign particles and/or for compensating for fitment inaccuracies can be provided in the locking position between the preferably rounded-off wedge-like tip of the projection and the wall of the third recess.

To simplify the lock element, at least some or preferably all portions of the mechanically non-loaded lock element can be non-curved or non-bent, that is to say they can be straight or linear, with preferably rounded transitions between the portions. The above-specified first, second and third angles of the lock element relate preferably to the cross-section of the profile-like lock element.

The lock element can be in one piece. Preferably the lock element can be cut to length from an extrudate preferably made from plastic.

The present invention is described in greater detail hereinafter by means of a plurality of embodiments of the locking system, illustrated in a drawing in which.

FIGS. 1 through 5 each show a cross-sectional view of an embodiment of a locking system 1 for plate-shaped panels 4.1, 4.2 each having two larger side surfaces 2 and edges 3. These are provided at least at two mutually opposite edges 3 with mutually complementary hook profiles, a first hook profile 5.1 and a second hook profile 5.2, for respectively connecting similar panels 4.1, 4.2 to provide a floor, wall or ceiling covering (not further shown here).

The hook profiles 5.1, 5.2 respectively have a hook element 6 with a hook neck 7.1 and an end lateral hook projection 7.2 which delimits a recess 8 having a first undercut 9.1 which is operative in a transverse direction q and a second undercut 9.2 which is operative perpendicularly to the larger side surfaces 2. The transverse direction q faces perpendicularly to the longitudinal direction of the oppositely disposed edges 3 and to the larger side surfaces 2, wherein the longitudinal direction in all of FIGS. 1 through 5 is perpendicular to the plane of the drawing. In a joining movement f the hook elements 6 are hooked in engaging relationship into a connecting position shown in FIG. 1 through 5 with engagement of their hook projection 7.2 into the first undercut 9.1 of the respective other hook element 6. FIGS. 1 through 5 each show the interengaging hook profiles 5.1, 5.2 of two similar panels arranged on a base B, namely a lower panel 5.1 and an upper panel 5.2, in the connecting position.

Provided on the hook projection 7.2 of the hook elements 6 is a first inclined portion 10.1 delimiting the first undercut 9.1 and a second inclined portion 10.2 which is opposite to the first inclined portion 10.1. In the joining movement f the hook profiles 5.1, 5.2 slide against each other at the first inclined portions, whereby the panels 4.1, 4.2 are guided against each other in the transverse direction q. In the examples shown here, the joining movement b is effected in such a way that the upper panel 4.2 is attached to the facing first hook profile 5.1 of the lower panel 4.1 inclinedly relative to the larger side surface 2 thereof and is pivoted thereat as the pivot point into a laying plane E which here is perpendicular to the plane of the drawing. That connecting procedure is described in greater detail in DE 10 2005 062 361 to which attention is directed in this connection.

In addition the system has a one-piece lock element 11 having at least a first spring portion 12.1 and a first foot portion 13.1 and which is arranged in the connecting position between the hook profiles 5.1, 5.2. Although this is not explicitly shown here, before the joining movement b the lock element is inserted into an insertion position in the embodiments shown in FIGS. 1, 3 through 5 into the first undercut 9.1 of the first hook profile 5.1 of the lower panel 4.1, and, in the embodiment of FIG. 2, into the first undercut 9.1 of the second hook profile 5.1 of the upper panel 4.2, in such a way that it bears with its first foot portion in areal relationship in the first undercut. The lock element 11 is cut to length from an extruded plastic profile, being the length of the associated hook profiles 5.1, 5.2. FIGS. 1 through 5 each show a cross-sectional view in which all parts are sectioned so that the edges 3 are arranged perpendicularly to the plane of the drawing. Only the lock element is shown as sectioned in order to emphasize it.

The second undercut 9.2 has a space 14 delimited by the lock element 10 in the locking position shown in the drawing, and the first hook profile 5.1. In addition there is a third undercut 9.3 in the second hook profile 5.2 and the first hook profile 5.1 respectively, which in the connecting position of the two panels 4.1, 4.2 is in opposite relationship to the second undercut 9.2 of the first hook profile 5.1 and the second hook profile 5.2 respectively.

In the usual connecting position the panels 4.1, 4.2 bear against each other in a connecting plane V perpendicularly to the transverse direction q by way of abutting surfaces 15 without a gap being formed therebetween, wherein the abutting surfaces 15 respectively open into a larger side surface 2 which is in the form of the top side O. In the embodiments of FIGS. 1 and 3 through 5 the abutting surfaces 15 are delimited at the rear by the second undercut 9.2 of the lower panel 4.1 and by the third undercut 9.3 of the upper panel 4.2.

Figure 1:
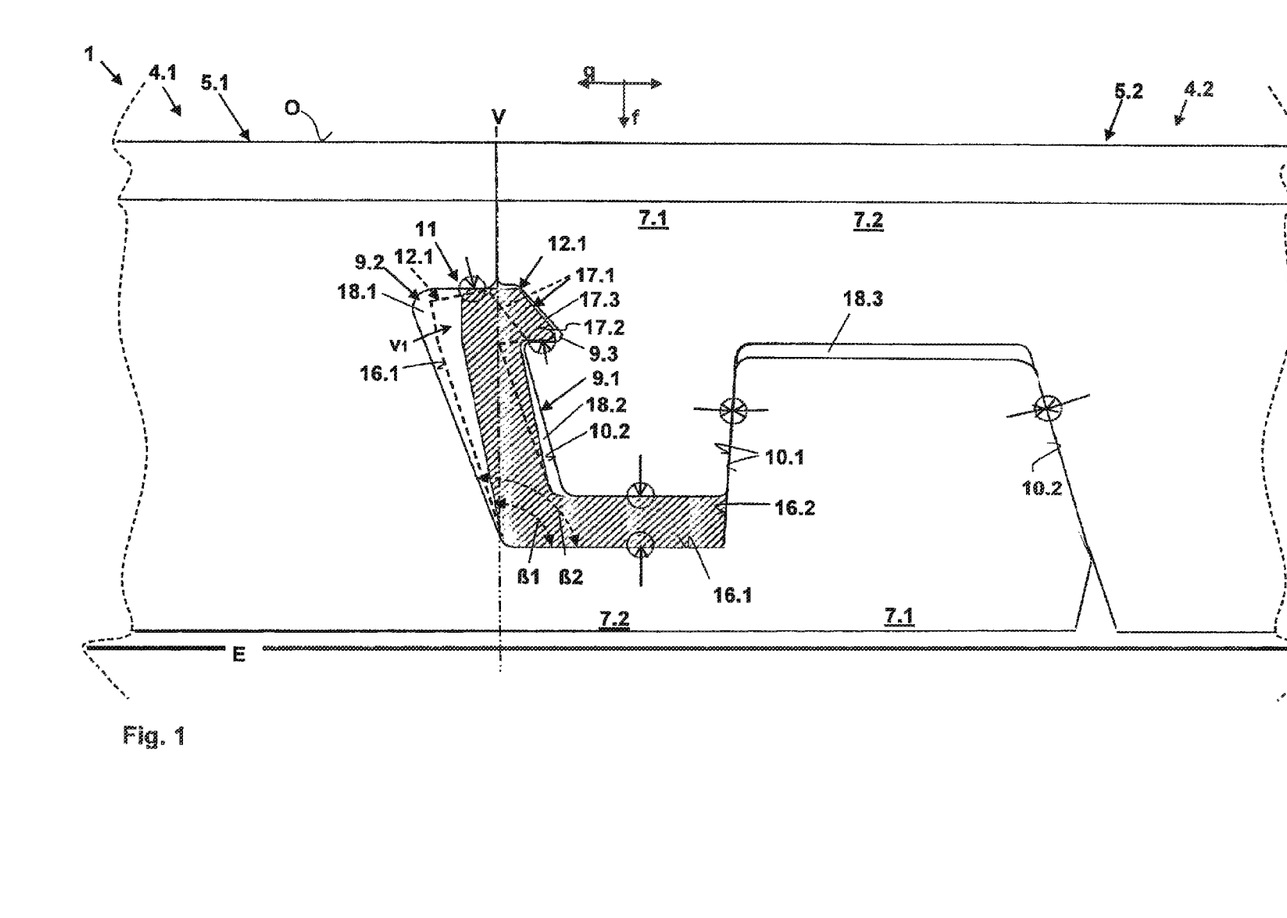
FIG. 1 shows a cross-sectional view of a first embodiment of a locking system with two panels which are locked in a connecting position by means of mutually complementary hook profiles and a lock element.

With the joining movement b the first spring portion 12.1 of the lock element 10 is deflected into the space 14 into an open position, building up a spring force, by sliding with a free end 16 of its first spring portion 12.1 against the second inclined portion 10.2 of the respective other hook profiles 4.2, 4.1, that is to say into which it is not inserted. Leading in the joining movement f and delimiting the second inclined portion 10.2, the third undercut 9.3 associated with that lock element 11 is introduced in the transverse direction q into the hook projection 7.2. FIG. 1 shows the first spring portion 12.1 in broken contour lines in its open position in which it has reached the third undercut 9.2 delimiting the second inclined portion 10.2, shortly before reaching the connecting position for the two panels 4.1, 4.2. When the connecting position of the two panels 4.1, 4.2 is reached the lock element 10 automatically relaxes with its first spring portion 12.1, with positive locking of the two panels 4.1, 4.2, out of the open position into the third undercut 9.2 in a first locking movement $v_1$ into a locking position in such a way that in the locking position it bears against the respective other hook profile 4.2, 4.1, in a pre-stressed condition.

The recesses 8 of the hook profiles 5.1, 5.2 are each of a groove-like configuration with a groove bottom 16.1 and groove side walls, a first groove side wall 15.2 delimiting the first undercut 9.1 and a second groove side wall 15.3 delimiting the second undercut 9.2 and the space 14. The groove bottom 15.1 is arranged flat and parallel to the top side O. In the insertion position the lock element 11 is supported with its first foot portion 13.1 in areal relationship against the groove bottom 15.1 and against the groove side walls 16.2, 16.3 of the recess 8. The first foot portion 13.1 and the first spring portion 12.1 of the lock element 11 include a first angle $\beta 1$ of greater than 90°. The groove bottom 16.1 extends in the transverse direction q to the connecting plane V. In the connecting plane V the first undercut 9.1 makes the transition into the second undercut 9.2. The second groove side wall 16.3 and the groove bottom 16.1 include a second angle $\beta 2$ which is greater than the first angle $\beta 1$.

The first spring portion 12.1 has a hook-like free end 17 with a lateral projection 17.1 which converges laterally in a wedge-like configuration to a rounded tip 17.1 and has a ramp 17.3. The hook projection 7.2 of the hook profile 5.2, in which the lock element 11 is not inserted, slides against that ramp 17.3 with its second inclined portion 10.2, with deflection of the spring portion 13, into its open position. When the lateral projection 17.1 reaches the third undercut 9.3 of the respective other hook profile 5.2, that delimits the second inclined portion 10.2, then the first spring portion 12.1 relaxes with positive locking of the two hook profiles 5.1, 5.2, into a locking position into the third undercut 9.3. In the locking position the lock element 10 bears in leading relationship in the locking movement b within the second undercut in positively locking relationship in opposition to the first locking movement $v_1$ and trailing in the first locking direction v within the third undercut 9.3 in positively locking relationship in the locking movement b. The approximate position of those positively locking relationships is indicated by dotted circles, wherein the positively locking relationship is respectively implemented over the entire extent of the surfaces bearing against each other.

To avoid a relative displacement of the panels 4.1, 4.2 in the connecting position in the joining movement f there is a further positively locking engagement at the first foot portion 13.1 which in the connecting position bears at the top side in opposition to the joining movement f against the hook projection 7.2 of the second hook profile 5.2 or in the connecting direction against the hook projection and in the joining movement f at the bottom side against the first undercut 9.1.

The space 14 delimited by the first spring portion 12.1 is of such a size that a first free space 18.1 for receiving abrasion and/or dust particles remains even in the open position of the first spring portion 12.1 (FIG. 1). As an enlargement of the first free space 18.1 the end 17 of the first spring portion 12.1 is angled away from the second groove side wall 16.3. A second free space 18.2 for receiving abrasion and/or dust particles is also provided between the first spring portion 12.1 and the second inclined portion 10.2 of the respective other hook element 6. In all illustrated embodiments of the locking system 1 no forces are transmitted in and in opposite relationship to the joining movement f by way of the respective other hook projection 7.2 and the respective other first undercut 9.1. On the contrary there is between them a third free space 18.3 for receiving abrasion and/or dust particles.

Figure 2:
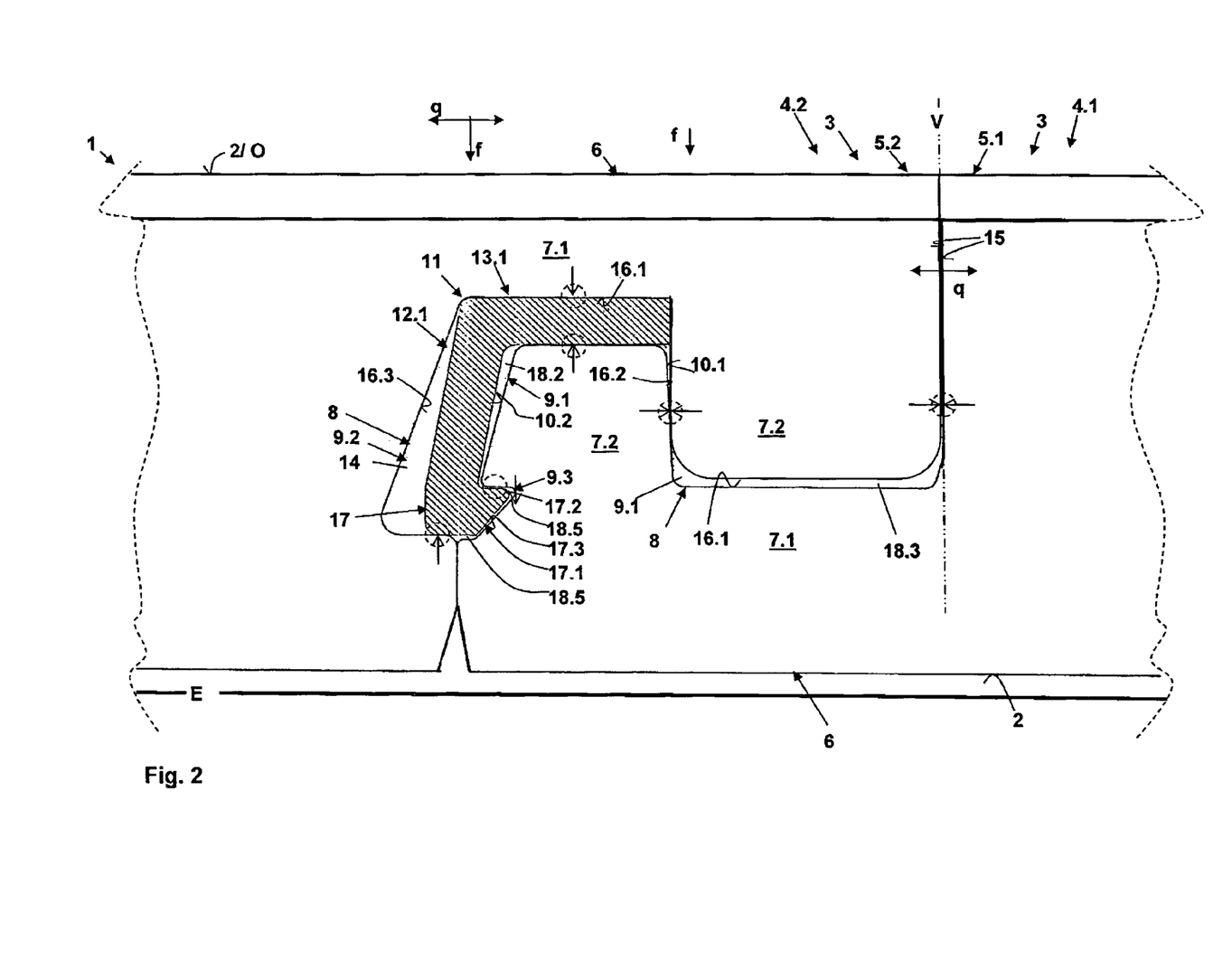
FIG. 2 shows a cross-sectional view of a second embodiment of the locking system with a lock element arranged differently from FIG. 1.

In the second embodiment of the locking system 1 as shown in FIG. 2 the lock element 11 is arranged in mirrored relationship about a mirror plane parallel to the top side O, being inserted in the upper panel 4.2 before the joining movement f. It faces with its free end 17 in the joining movement f. In a fashion corresponding to the mirroring relationship the panel which here is at the left is arranged as the upper panel 4.2 and the panel which here is at the right is arranged as the lower panel 4.1. Therefore the procedure in the joining movement f is the same as in the first embodiment of the locking system, insofar as it is deflected into the space 14 with a sliding movement at the end against the second inclined portion 10.2 here of the lower panel 4.1, and when the connecting position of the panels 4.1, 4.2 is reached, it latches in positively locking relationship into the third undercut 9.3. That mirror-image arrangement of the lock element is also possible in the other embodiments of the locking system, but is not explicitly shown here, but can be easily deduced from FIG. 3 through 5 respectively by mirror image constitution.

Figure 3:
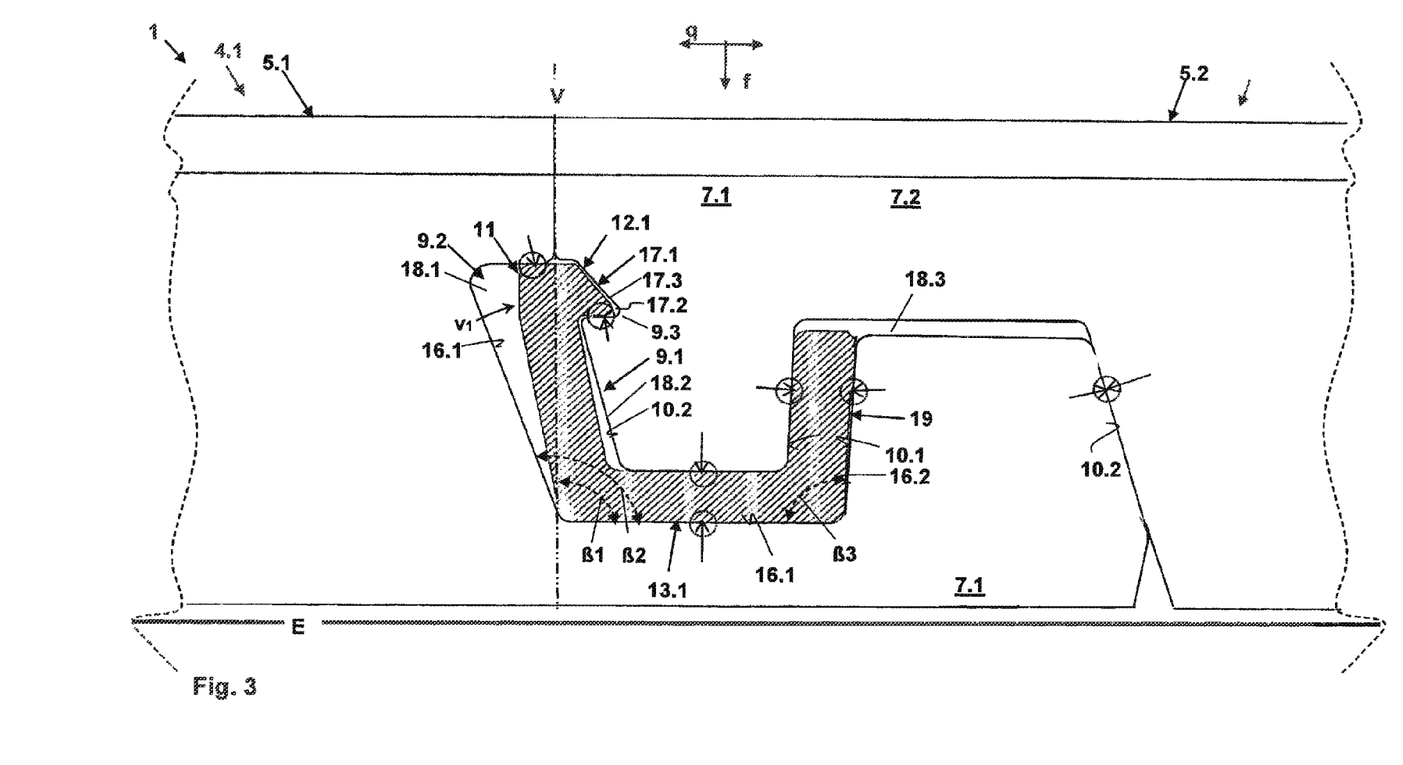
FIG. 3 shows a cross-sectional view of a third embodiment of the locking system with a lock element which is enlarged in relation to FIGS. 1 and 2.
Figure 4:
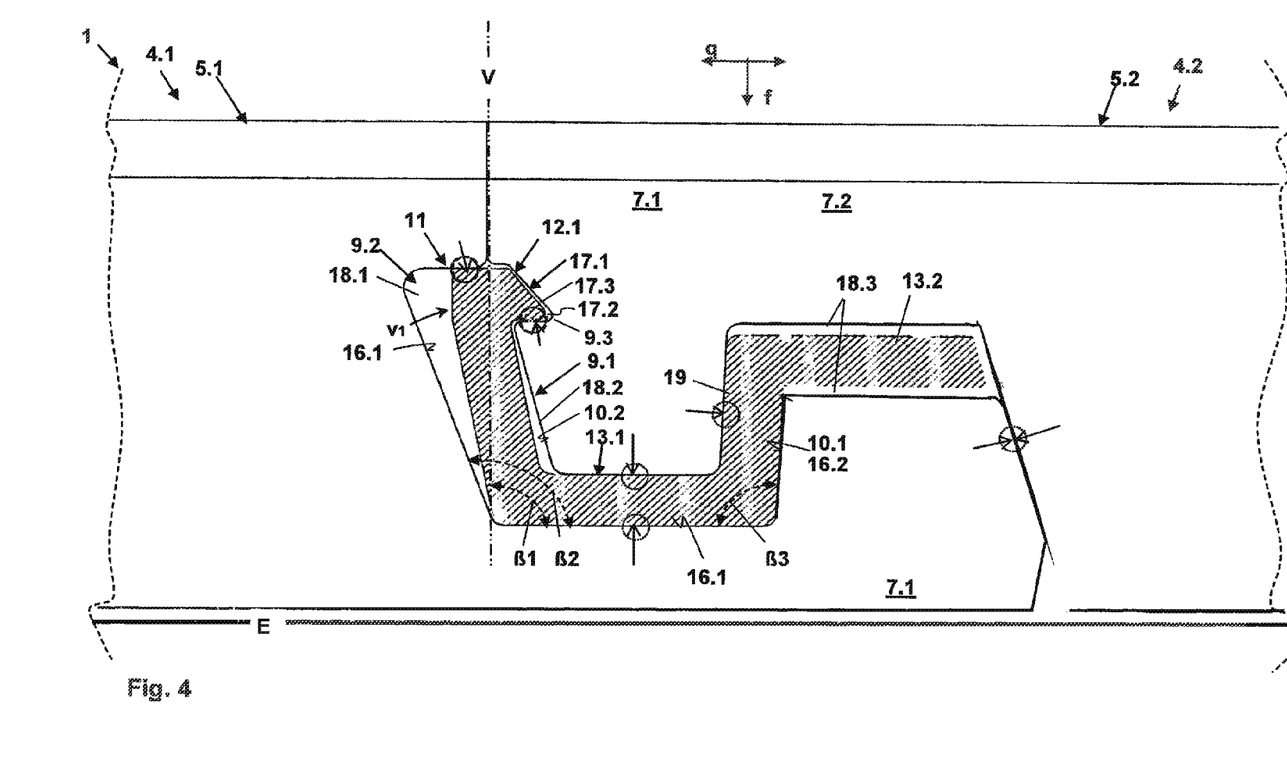
FIG. 4 shows a cross-sectional view of a fourth embodiment of the locking system with a lock element which is enlarged in relation to FIG. 3.
Figure 5:
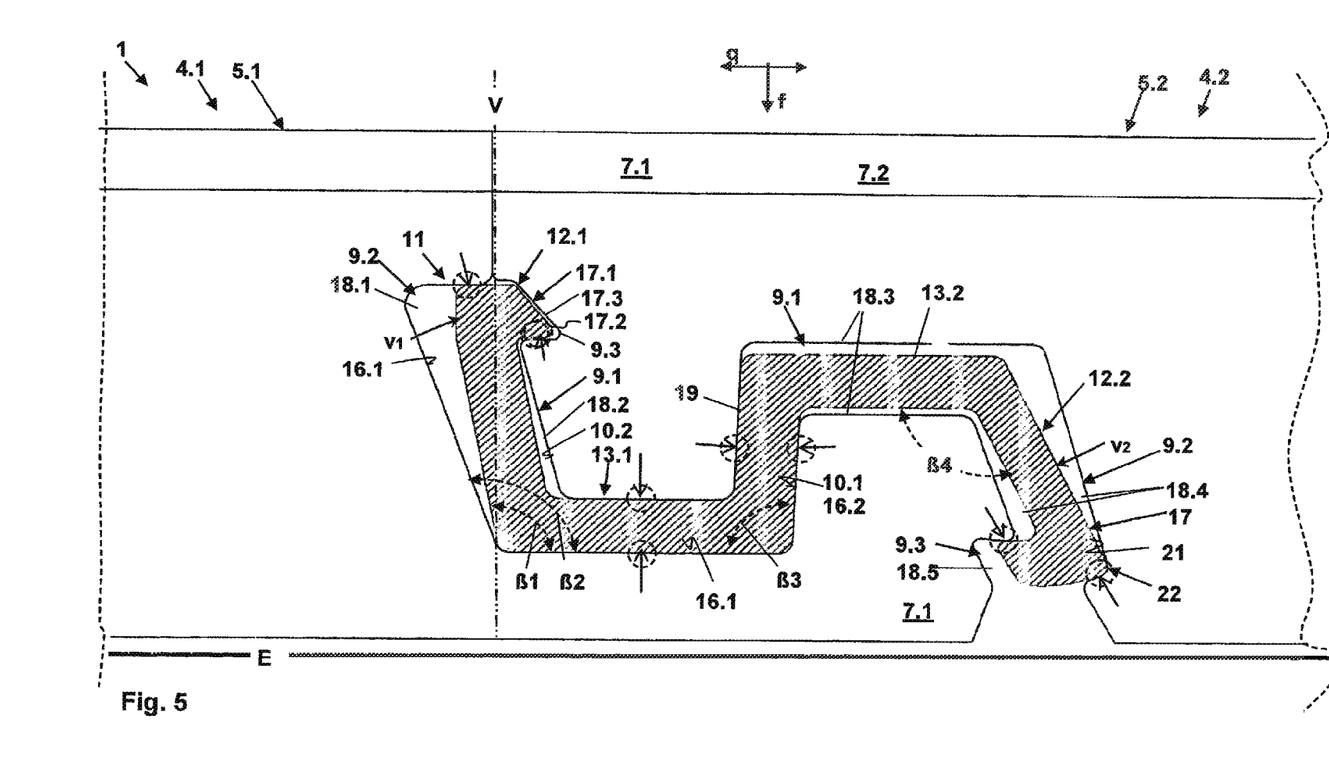
FIG. 5 shows a cross-sectional view of a fourth embodiment of the locking system with a lock element which is enlarged in relation to FIG. 4.

In the embodiments of the locking system 1 shown in FIG. 3 through 5 the lock element 11, adjoining its first foot portion 13.1, has a portion 19 which is angled relative thereto and which is spaced in the transverse direction q relative to the first spring portion 12.1. The portion 19 is arranged in the locking position in relation to the transverse direction q in positively locking relationship between the hook projections 7.2 of the two hook profiles 5.1, 5.2. The portion 19 includes a third angle $\beta 3$ of greater than 90° with the first foot portion 13.1. The lock element 11 can be more firmly held in the first undercut 9.1 by means of the additional portion 19. As indicated in FIG. 3 by dotted circles, forces are transmitted in the transverse direction q by way of the portion 19. In the third embodiment of the locking system 1 shown in FIG. 3 the portion 19 has at its end an inclined plane 20, against which the hook projection 7.2 of the second hook profile 5.2 can be more easily guided into the recess 8 of the first hook profile 5.1 during the joining movement f in sliding relationship.

The fourth and fifth embodiments of the locking system 1 shown in FIGS. 4 and 5 respectively each have a second foot portion 13.2 which in the insertion position of the lock element 11 extends at the end from the portion 19 parallel to the top side O. Thus the lock element 11 is of a U-shaped cross-section with the first spring portion 12.1, the portion 19 in the form of a limb and the first foot leg 13.1 in the form of a transverse leg. The second foot portion 13.2 is arranged spaced relative to the hook profiles 5.1, 5.2 in the joining movement f so that a third free space 18.3 is provided above and beneath the second foot portion 13.2. Thus the adjacent hook projection 7.2 and the first undercut are reliably spaced from each other and from the lock element 11 so that it is possible to prevent contact of same and thus a possible displacement in panels adjoining the abutting surfaces 15, with the formation of a jump in the joining movement. In addition it is possible in that way to compensate for possible fitment inaccuracies of the lock element 11 relative to the panels 4.1, 4.2.

The lock element 11 of the fifth embodiment of the locking system 1 shown in FIG. 5 has a second spring portion 12.2 arranged spaced in the transverse direction q relative to the first spring portion 12.1. The second spring portion 12.2 extends with its free end 17 in the joining movement f. Its free end 17 is hook-like the same as the free end 17 of the first spring portion 12.1, that is to say it converges wedge-like to a lateral tip 12.1 and is provided with an inclined plane 17.2. As can be seen from FIG. 5 the second spring portion 12.2 is arranged rotated relative to the first spring portion 12.1 in axis-symmetrical relationship through about 180° with respect to an axis of symmetry s. Accordingly in a second locking movement $v_2$ in opposite relationship to the first locking movement $v_1$ it locks into the recess on the hook element 6 of the lower panel 4.1. The positively locking contact of the hook-shaped end 17 is also identified here by dotted circles. It will be clear that this produces a second positively locking latching connection, by means of which the two hook profiles 5.1, 5.2 are connected.

The second spring portion 12.2 is resiliently deflected into its open position with the joining movement f with sliding motion of a rounded tip 17.1 against the second inclined portion 10.2 of the lower panel 4.1, and automatically pivots into the third undercut 9.3 of the lower panel 4.1 when the connecting position of the panels 4.1, 4.2 is reached. That is effected at the same time as the deflection and latching of the first spring portion 12.1 into the third undercut 9.3 associated therewith.

The second spring portion 12.2 includes, with the second foot portion 13.2, a fourth angle $\beta 4$ which is greater than the first angle between the first spring portion and the first foot portion. The hooked end 17 of the second spring portion 13.1 is thus held at a side 21 facing away from its tip 17.1 against the side surface 22 delimiting the second undercut 9.2, in such a way that the end 17 bears in a prestressed condition in the third undercut 9.3. At the location at which the end bears against the side surface 21 of the second undercut 9.2 the side surface 21 has a step into which the second spring portion 12.2 is supported. Thus the second spring portion 12.2 is counter-supported there with a force component in opposite relationship to the joining movement f and with a force component in the transverse direction q relative to the first spring portion 12.1, and into the third undercut. Thus the lock element 11 is gripped in the locking position between the hook profiles 5.1, 5.2. All those measures consolidate the locking of the lock element to the panels 4.1, 4.2.

The specified angles $\beta 1$ through $\beta 4$ relate to the cross-sectional views of the lock element, shown in the Figures.

The two third free spaces 18.3 above and beneath the second foot portion 13.2 are enlarged by fourth free spaces 18.4 at both sides of the second spring portion 12.2. A fifth free space 18.5 for the foreign particles is provided between the projection 17.1, in particular in the region of its tip 17.3, and the wall delimiting the third undercut 9.3.

LIST OF REFERENCES 1 locking system
2 side surface
3 edge
4.1 lower panel 4.2 upper panel
5.1 first hook profile
5.2 second hook profile
6 hook element
7.1 hook neck
7.2 hook projection
8 recess
9.1 first undercut
9.2 second undercut
9.3 third undercut
10.1 first inclined portion
10.2 second inclined portion
11 lock element
12.1 first spring portion
12.2 second spring portion
13.1 first foot portion
13.2 second foot portion
14 space
15 abutting surface
16.1 groove bottom
16.2 first groove side wall
16.3 second groove side wall
17 end
17.1 projection
17.2 tip
17.3 ramp
18.1 first free space
18.2 second free space
18.3 third free space
18.4 fourth free space
18.5 fifth free space
18.6 sixth free space
19 portion
20 plane
21 side surface
22 step
E laying plane
O top side
V connecting plane
f joining movement
q transverse direction
s axis of symmetry
β1 first angle
β2 second angle
β3 third angle
β4 fourth angle
v₁ first locking movement
v₂ second locking movement

The invention claimed is:

1. A locking system for plate-shaped panels which each have two larger side surfaces and edges and which for the connection of similar panels to provide a floor, wall or ceiling covering are provided at least at two mutually opposite edges with mutually complementary profiles, a first hook profile and a second hook profile, each with a hook element which has a hook projection and first undercut adjacent to the hook projection, wherein the hook elements of complementary hook profiles of adjacent panels hook in engaging relationship into a connecting position in a joining movement with at least one component perpendicularly to the larger side surface with respective engagement of its hook projection into the first undercut of the respective other hook element, there is provided a profile lock element which has a first spring portion and a first foot portion and which can be inserted in the first undercut of the first hook profile, the first undercut at least of the first hook profile has a second undercut perpendicular to the larger side surfaces and the lock element with attainment of the connecting position of the two panels automatically engages with its first spring portion in a locking movement from an open position into a third undercut of the hook element of the second hook profile, said third undercut being perpendicular to the larger side surfaces and being in opposite relationship in the connecting position of the two panels to the second undercut of the first hook profile, with positive locking of the two hook profiles perpendicularly to the larger side surfaces into a locking position, wherein the lock element is supported with the first foot portion in the first undercut and the second undercut has a space which is delimited by the lock element in the locking position and the first hook profile and in which or into which the lock element can be elastically deflected with its first spring portion from a rest position into the open position, wherein in the rest position the first foot portion is angled at a first angle greater than 90° to the first spring portion, wherein the lock element has an additional portion adjoining the first foot portion and spaced from the first spring portion, wherein the first foot portion and the additional portion rest completely against respective surfaces of the first hook profile in both the open position and the connecting position of the two panels.

2. A locking system as set forth in claim 1 characterised in that in an insertion position into the first undercut the lock element occupies the space in the second undercut solely with its first spring portion and can be resiliently deflected into the open position during the joining movement with sliding movement against a first inclined portion of the hook element of the second hook profile into the space.

3. A locking system as set forth in claim 1 characterised in that the hook profiles respectively have a groove recess which contains the first undercut and the second undercut and which has a groove bottom and groove side walls, a first groove side wall delimits the second undercut and a second groove side wall delimits the first undercut, wherein the lock element is supported with the first foot portion against the groove bottom and the groove side walls.

4. A locking system as set forth in claim 3 characterised in that the first foot portion has a contact surface that conforms to the groove bottom.

5. A locking system as set forth in claim 4 characterised in that the groove bottom extends at least approximately parallel to the larger side surfaces.

6. A locking system as set forth in claim 5 characterised in that the groove bottom extends in the transverse direction to the third undercut and the first groove side wall and the groove bottom include a second angle greater than the first angle between the first foot portion and the first spring portion of the lock element.

7. A locking system as set forth in claim 1 characterised in that adjoining the first foot portion the lock element has a portion which is angled relative thereto and which is spaced relative to the first spring portion in the transverse direction and which is disposed in the locking position with respect to the transverse direction in positively locking relationship between the hook projections of the two hook profiles.

8. A locking system as set forth in claim 7 characterised in that the lock element in a configuration adapted to the two hook profiles is of an angular S-profile shape with the additional portion being centrally arranged and with a second foot portion in connecting relationship of the additional portion with a second spring portion.

9. A locking system as set forth in claim 8 characterised in that at least one of the first spring portion and the second spring portion respectively have a hooked free end with which the lock element is in positively locking contact in the locking position for positively lockingly connecting the panels in the respectively associated second and third undercuts.

10. A locking system as set forth in claim 1 characterised in that the lock element is in one piece in the form of an extruded plastic component.

11. A locking system as set forth in claim 1 characterised in that the panel having the first hook profile engages in relation to a laying plane as an underneath panel with its first hook profile under the second hook profile of the panel disposed as the upper panel.

12. A panel having a locking system as set forth in claim 1.

* * * * *